March 3, 1959 W. B. KIRK 2,875,864
FLUID MOTOR WITH SLACK ADJUSTER VALVE
Filed July 24, 1953
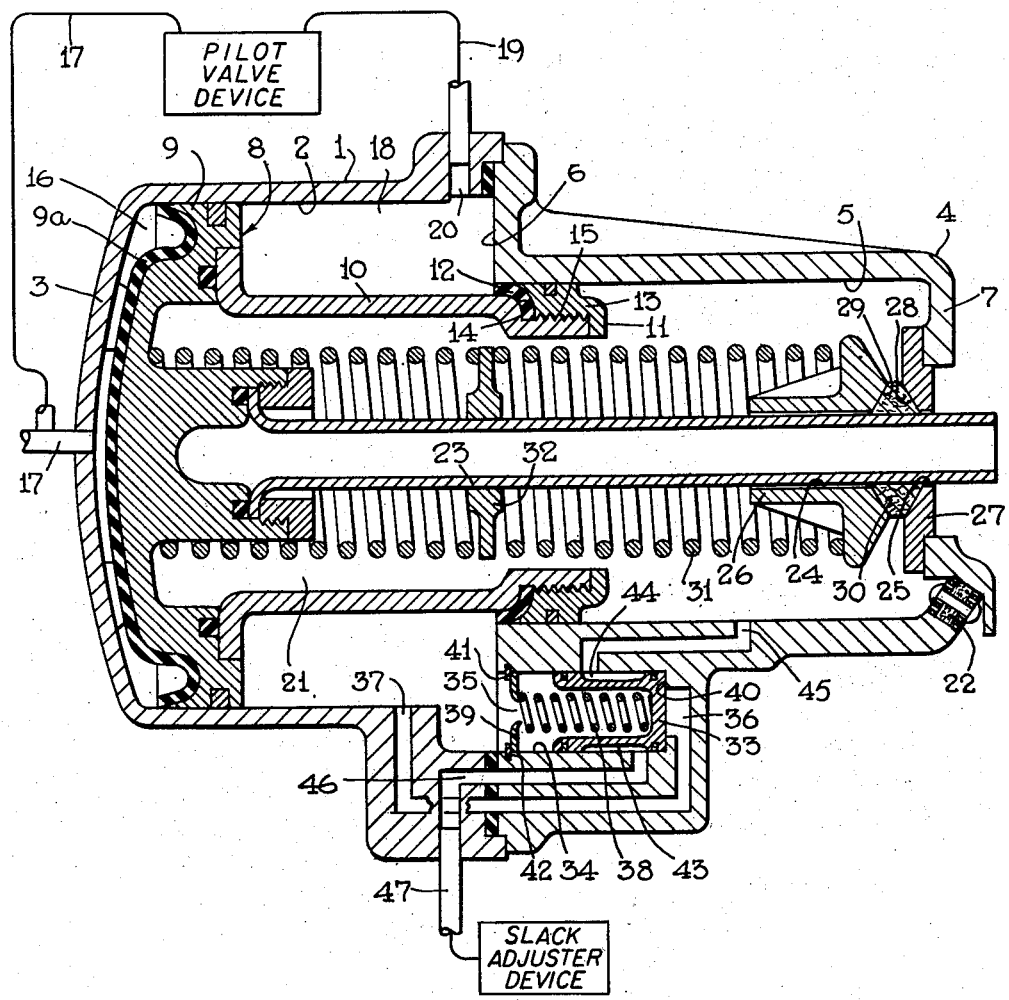
INVENTOR.
Walter B. Kirk
BY
Adelbert A. Steinmiller
ATTORNEY United States Patent Office 2,875,864
Patented Mar. 3, 1959

2,875,864

FLUID MOTOR WITH SLACK ADJUSTER VALVE

Walter B. Kirk, East McKeesport, Pa., assignor to Westinghouse Air Brake Company, Wilmerding, Pa., a corporation of Pennsylvania Application July 24, 1953, Serial No. 370,050

15 Claims. (Cl. 188—196)

This invention relates to fluid pressure brake cylinder devices and more particularly to brake cylinder devices adapted for use in load brake equipment of the type shown and described in U. S. Patent No. 2,482,246, issued on September 20, 1949, to Earle S. Cook et al., and assigned to the assignee of the present invention.

In the aforementioned patent there is disclosed and described a load brake equipment which is adapted to automatically provide different degrees of braking of a railway vehicle according to the degree of load carried thereby. The equipment comprises a brake cylinder device embodying a piston adapted to be operatively connected to the usual brake rigging and arranged to be actuated for applying force through said rigging to the usual brake shoe or shoes by action of pressure of fluid in the usual pressure chamber at one side of said piston, as controlled by a fluid pressure control valve device, against opposition of action of pressure of fluid in a compensating chamber at the opposite side of said piston, which latter pressure is dependent upon the degree of load on the vehicle; said piston being arranged to return to a rest position by action of the usual return spring upon venting of said usual chamber. The brake cylinder device is thus adapted to be so operated as to transmit to the brake rigging, at any particular pressure of fluid in the usual pressure chamber, as governed by the control valve device, a force proportional to the load condition of the vehicle between limits of no load and full load for varying the degree of braking accordingly.

It is desirable, with a brake cylinder device of the load compensating type just described, to provide for actuation of the usual slack adjuster device for taking up slack in the brake rigging whenever the brake cylinder piston travel exceeds a certain amount, in much the same manner as heretofore proposed with brake cylinder devices of the conventional type, wherein a casing port normally exposed to atmospheric pressure is so located as to be charged with fluid under pressure from the pressure chamber only when said piston travel exceeds said certain amount. However, with brake cylinder devices of the standard load compensating type, as shown in the aforementioned patent, such a casing port would normally be exposed to fluid pressure in the compensating chamber, and hence if the compensating chamber were charged with fluid at a sufficient pressure (as when the vehicle is less than fully loaded), it is obvious that the slack adjuster could be undesirably actuated during each application of brakes, even though such piston travel is less than said certain amount, and thus eventually cause the brake shoes to bind against the vehicle wheels.

The principal object of the invention is therefore to provide an improved load compensating type brake cylinder device adapted, under all load conditions of the vehicle, to so control the supply of fluid under pressure to a fluid pressure actuated slack adjuster that said slack adjuster will be actuated only if and when slack in the brake rigging is excessive as denoted by travel of the brake cylinder piston more than a preselected amount in effecting an application of brakes on the vehicle.

Another object of the invention is to provide a brake cylinder device of the above type embodying novel means for controlling operation of a fluid pressure actuated slack adjuster device.

Still another object of the invention is to provide a brake cylinder device of the above type which is positive in its operation and relatively inexpensive to fabricate.

Other objects and advantages will become apparent from the following more detailed description of the invention.

In the accompanying drawing, the single figure is an elevational view, partly in section and partly in outline, of a brake cylinder device embodying the invention.

Description

As shown in the drawing, the improved brake cylinder device comprises a casing portion 1 having a piston bore 2 extending longitudinally from one end and enclosed at an opposite end by a pressure head 3 preferably formed integrally therewith. A casing portion 4 is suitably secured in sealing engagement with the open end of casing portion 1. The casing portion 4 has a bore 5 coaxially aligned with, but of smaller diameter than, the bore 2, which bore 5 extends longitudinally from a transverse end 6 of said casing portion adjacent the bore 2 and terminates at a non-pressure head 7 preferably formed integrally with the opposite end of said casing portion.

A brake cylinder piston assemblage 8 comprises a piston head 9 slidably mounted in the bore 2 and having a resilient snap-on packing cup 9a so mounted to one side of said head as to prevent leakage of fluid under pressure to an opposite side of said head; and further comprises an annular sleeve-like member 10 sealingly secured at one end to said opposite side of said piston head and slidably guided at an opposite end within the bore 5 by means of an annular packing cup assemblage 11, which assemblage is slidable in sealing engagement with the wall of said bore 5.

The packing cup assemblage 11 comprises a packing cup 12 which is held by a chamfered end of an annular nut 13 against a rounded shoulder 14 on member 10 such that said packing cup is deflected around said shoulder toward the piston head 9 into engagement with the wall of bore 5, said nut being adapted for slidable engagement with said wall and secured in screw-threaded engagement with external threads 15 formed on said member. It is to be noted that an annular space will be created between the outer periphery of member 10 and the wall of bore 5 upon movement of packing cup 12 by the piston assemblage 8 toward the non-pressure head 7.

At the side of piston head 9 facing the pressure head 3 is the usual or main pressure chamber 16 which is constantly open to a brake cylinder pipe 17 that extends through said head. The pipe 17 is adapted for connection to a fluid pressure control valve device (not shown), such as the well-known AB valve shown and described in the patent to Clyde C. Farmer, No. 2,031,213, issued February 18, 1936, and which is operative to effect variations in the pressure of fluid in chamber 16 for controlling operation of the piston assemblage 8 to apply vehicle brakes in the usual manner.

At the opposite side of piston head 9 is an annular, load compensating pressure chamber 18 defined partly by the wall of bore 2, the outer surface of the annular member 10, and the transverse end 6 of casing portion 4. The chamber 18 is constantly open to a pipe 19 by way of an opening 20 provided in casing portion 1 adjacent the transverse end 6 of the casing portion 4. The pipe 19 is adapted for connection to a pilot or load compensating valve device, such as that described in the aforementioned patent to Cook et al., which is operative to provide in pipe 19 and thus in the chamber 18 fluid at the pressure of fluid in pipe 17 or at atmospheric pressure or at some intermediate pressure according as the vehicle is empty or fully loaded or partially loaded, respectively.

Also at the aforementioned opposite side of piston head 9 is a non-pressure chamber 21 open to atmosphere by way of air strainer 22 provided in the non-pressure head 7; said chamber being defined by the adjacent face of said piston head, the inner wall of annular member 10, the packing cup assemblage 11, the wall of bore 5 and said non-pressure head. A hollow piston rod 23 is connected at its one end to the piston head 9 and extends in coaxial alignment therewith through the non-pressure chamber 21 and exteriorly of said chamber through the non-pressure head 7. Intermediate its ends the piston rod 23 is slidably guided within aligned openings 24, 25 extending axially through a spring seat 26 and a bearing 27, respectively. The bearing 27 is mounted to the inner wall of the non-pressure head 7 and has a beveled face 28 adjacent a similarly but oppositely beveled face 29 of spring seat 26 for compressing a felt filtering ring 30 between said beveled faces and squeezing said ring radially inward against the outer surface of the piston rod 23. A two-part return spring 31 disposed in chamber 21 is arranged about the piston rod 23 and between the spring seat 26 and the adjacent face of piston head 9 for normally maintaining the piston assemblage 8 in a brake release position, in which it is shown in the drawing, and which position is defined by abutting engagement of the adjacent side of the packing cup 9a with the inner wall of pressure head 3. Movement of piston 9 out of release position in the direction of the right hand, as viewed in the drawing, is adapted to apply brakes on a vehicle, in the usual manner. A spring support member 32 slidably mounted on the piston rod 23 is arranged between the adjacent ends of the two parts of spring 31 for preventing said spring from beating, scoring and rubbing said piston rod.

According to the invention, a cylindrical shuttle valve 33 is slidably mounted in a bore 34 provided in casing portion 4 and extending a certain distance longitudinally inward from the transverse end 6 of said casing portion. The valve 33 is subject at one side to pressure of fluid in a chamber 35 open to compensating chamber 18 and at the opposite side to pressure of fluid in a chamber 36. A conduit or passage 37, formed in casing portions 1, 4 and open at one end to chamber 36, is open at an opposite end to the bore 2; said opposite end being so located, according to design, as to be normally exposed to pressure of fluid in chamber 18 but adapted to be exposed to pressure of fluid in chamber 16 whenever movement of the piston assemblage 8 is in excess of a chosen degree in applying the brakes to a vehicle, for reasons to be brought out in subsequent description of operation.

A spring 38 disposed in chamber 35 is suitably arranged between an annular spring retaining element 39 and the adjacent recessed side of valve 33 for normally maintaining said valve in a normal position, in which it is shown in the drawing; said position being defined by abutting engagement of the opposite side of said valve with a radial stop shoulder 40 formed in casing portion 4 at the base of bore 34. The element 39, which is slidable within the bore 34 for facilitating assembly, is maintained in position by action of the spring 38 which holds said element in abutting engagement with the adjacent radial surface of a snap ring 41 partly accommodated within an annular groove 42 formed in casing portion 4 in encirclement of said bore. The element 39, as backed up by the ring 41, also serves as a valve stop for limiting the extent of travel of the valve 33 toward the chamber 18, an opposite position of said valve being defined by abutting engagement of the adjacent end of said valve with said element.

An annular, elongated groove 43 is formed in the outer periphery of valve 33 intermediate its ends for providing an annular chamber 44 defined by said groove and the wall of bore 34. A conduit or passage 45 in casing portion 4 is open at its one end to the bore 5 and at its opposite end is constantly open to chamber 44; its said one end being so positioned, according to design, as to normally be exposed to pressure of fluid in the non-pressure chamber 21 but adapted to be exposed to pressure of fluid in the compensating chamber 18 at the time the piston assemblage 8 opens the usual pressure chamber 16 to passage 37. A control conduit or passage 46, provided in casing portions 1, 4, is open at one end to an actuating or control pipe 47, while an opposite end is so located as to be open to the chamber 44 when the valve 33 is in its previously defined normal position but is adapted to be exposed to pressure of fluid in the chamber 36 when said valve is in its previously defined opposite position. The pipe 47 is connected to a fluid pressure actuated slack adjuster device of the usual fluid pressure controlled type.

Operation

In operation, assume initially that the main pressure chamber 16 is devoid of fluid under pressure. Under such condition, the piston assemblage 8 will be in its previously defined brake release position under action of spring 31, while the compensating pressure chamber 18 will also be devoid of fluid under pressure, being controlled by way of the pilot or compensating valve device which, in turn, is controlled by pressure of fluid in chamber 16. With chamber 18 devoid of fluid under pressure, the chambers 35, 36 will also be devoid of fluid under pressure and the shuttle valve 33 will consequently be in its previously defined normal position under action of spring 38. With the shuttle valve 33 in this position, the slack adjuster device will be vented to atmosphere by way of an exhaust communication defined by the pipe 47, passage 46, chamber 44, passage 45, and non-pressure chamber 21. As a consequence of this assumed condition, the various components of the improved brake cylinder device will therefore be in the respective positions in which they are shown in the drawing.

Assuming now that chamber 16 is charged with fluid under pressure by way of pipe 17 for the purpose of effecting a brake application, the piston assemblage 8 under action of such pressurized fluid will move in the direction of the non-pressure head 7 against resistance of spring 31 and pressure of fluid in the chamber 18, which latter pressure will be substantially equal to that in chamber 16 if the vehicle is empty, atmospheric if said vehicle is fully loaded, or at some intermediate value if said vehicle is partially loaded.

Assuming further that the slack in the brake rigging is within allowable limits, the piston assemblage 8 will not be moved a sufficient distance during such brake application to open chamber 16 to passage 37 and chamber 18 to passage 45; hence the chamber 36 will remain open to chamber 18 by way of passage 37, and the passage 45 will remain in communication with the non-pressure chamber 21. Since chamber 35 is open to chamber 18, pressure of fluid in chambers 35 and 36 will be equal irrespective of the load condition of the vehicle, and hence the shuttle valve 33 will remain in its previously defined normal position under action of spring 38, thereby maintaining the slack adjuster device vented to atmosphere by way of the previously defined exhaust communication including passage 45 and the non-pressure chamber 21.

Let it now be assumed that, due to wear of brake shoes or rigging the slack in the brake rigging becomes such that, in applying brakes, the piston assemblage 8 will move toward the right hand a distance sufficient to open passages 37 and 45 to the usual pressure chamber 16 and load compensating chamber 18, respectively. Fluid under pressure will then flow from chamber 16 to chamber 36 by way of passage 37.

If the vehicle is empty, the pressure of fluid in chamber 18 will equalize into the chambers 35, 36, causing the shuttle valve 33 to remain in its normal position under action of spring 38. However, fluid under pressure will flow from chamber 18, by way of the previously mentioned annular space and passage 45, to chamber 44 and thence by way of passage 46 and pipe 47 to the slack adjuster device for initiating a slack take-up operation in the well-known manner.

If, however, the vehicle is loaded and, as a consequence, chamber 18 is either at atmosphereic pressure, or a pressure less than the pressure in chamber 16, the pressure of fluid supplied from chamber 16 to chamber 36 and acting on the valve 33 will overcome the opposing effect of spring 38 plus whatever pressure of fluid may be acting in chamber 35, and move said valve into its previously defined opposite or left-hand position. As the valve 33 moves into this position, it will successively terminate registry of the groove 43, and hence of chamber 44, with the passage 46 and then establish fluid pressure communication between the chamber 36 and passage 46, permitting fluid under pressure to flow by way of said passage and the pipe 47 to the slack adjuster device for initiating the slack take-up operation.

It will thus be noted that if slack in the brake rigging is within allowable limits, the passages 37, 45 will remain exposed to chambers 18, 21, respectively, throughout an application of brakes; and irrespective of the load condition of the vehicle and consequent value of fluid pressure in the compensating chamber 18, the shuttle valve 33 will remain in normal position for maintaining the slack adjuster actuating pipe 47 vented to atmosphere by way of chamber 44, passage 45 and the non-pressure chamber 21. If, however, slack in the brake rigging is excessive and causes the piston assemblage 8 to uncover passages 37, 45 to chambers 16 and 18, respectively, then the slack adjuster actuating pipe 47 will be charged with fluid under pressure in either of two ways: If the vehicle is empty, then by way of chamber 18, passage 45, and chamber 44 because the shuttle valve 33 will remain in normal position due to equality of pressures in the pressure chamber 16 and compensating chamber 18 and hence in chambers 36, 35 at opposite sides of said shuttle valve; whereas if the vehicle is fully loaded or else partially loaded to a degree sufficient to cause fluid pressure in chamber 36 to overcome the opposing effect on the shuttle valve 33 of reduced fluid pressure in chamber 35 and action of spring 38, said shuttle valve will move to its previously defined opposite position for uncovering passage 46 to chamber 36 and thus causing the slack adjuster actuating pipe 47 to be charged with fluid under pressure from chamber 16 by way of passage 37, chamber 36, and passage 46. Hence the shuttle valve 33 is operative in such a manner as to supply fluid under pressure to the slack adjuster actuating pipe 47 only when, during a brake application, slack in the brake rigging is excessive and to prevent such supply at all other times.

With the piston assemblage 8 in a position causing application of brakes, if chamber 16 is vented to atmosphere for effecting a brake release, the piston assemblage 8 will be returned to its previously defined brake release position by action of spring 31, and the chamber 18 will likewise be vented to atmosphere, thereby venting chambers 35 and 36, as will be understood from previous description. As the chambers 35, 36 are vented, the spring 38 will return the valve 33 to its normal position if, by virtue of the load condition of the vehicle, said valve had theretofore been in its left-hand position. With the valve 33 in its normal position, fluid under pressure will be vented from the slack adjuster device to atmosphere by way of the previously described "exhaust" communication, thereby concluding the slack take-up operation.

Summary

It will now be seen that the improved brake cylinder device, which is especially adapted for use with load brake equipment, is relatively simple in construction and embodies novel means for controlling operation of a fluid pressure actuated slack adjuster device; said means being operative, irrespective of the load condition of the vehicle and consequent value of fluid pressure in the compensating chamber, to cause operation of said slack adjuster device only if and when travel of the brake cylinder piston assemblage exceeds a preselected amount in effecting a brake application, due to excessive slack in the brake rigging.

Having now described my invention, what I claim as new and desire to secure by Letters Patent is:

1. In a variable load brake apparatus for a vehicle, a casing, a brake cylinder piston assemblage slidably mounted in said casing and coperative therewith to define a main pressure chamber chargeable with fluid under pressure or ventable to atmosphere for effecting operation of said assemblage, a load compensating chamber chargeable with fluid at the pressure in said main chamber or at a lesser pressure or ventable to atmosphere according to the degree of loading of said vehicle, the pressure of fluid in said compensating chamber acting on a smaller effective area of said piston assemblage than that on which the opposing pressure of fluid in said main chamber acts, and a non-pressure chamber open to atmosphere, a first conduit normally exposed to pressures of fluid in said compensating chamber, a second conduit normally exposed to said non-pressure chamber, and a control conduit, said piston assemblage being operative upon the existence of a certain condition to travel beyond a normal operating range to an extended position for thereby exposing said first conduit and second conduit to pressure of fluid in said main chamber and in said compensating chamber, respectively, and means controlled by pressure of fluid in said first conduit and in said compensating chamber and operative to vent said control conduit to atmosphere by way of said second conduit except when said piston assemblage is in its extended position and then operative to effect pressurization of said control conduit by way of said first conduit or second conduit according to whether said vehicle is loaded or empty.

2. A brake cylinder device comprising an enclosed hollow casing, a brake cylinder piston assemblage slidably mounted in said casing having a certain operating range but movable beyond said range upon existence of a certain condition, said assemblage being subject to pressure in a main pressure chamber opposing pressures in a load compensating chamber and in a non-pressure chamber open to atmosphere, fluid pressure in said main chamber acting on a substantially greater effective area of said piston assemblage than fluid pressure in said compensating chamber, one pipe through which fluid under pressure may flow into or from said main chamber for effecting movement of said piston assemblage, another pipe through which fluid under pressure may flow into or from said compensating chamber, a first conduit exposed selectively to pressure of fluid in said compensating chamber or said main chamber according to whether said piston assemblage is moved within or beyond said range, a second conduit exposed selectively to pressure of fluid in said non-pressure chamber or in said compensating chamber according to whether said piston assemblage is moved within or beyond said range, a control conduit, a spring, valve means biased by said spring to one position for establishing fluid pressure communication between said second conduit and said control conduit but movable to another position for successively terminating such communication and establishing fluid pressure communication between said first conduit and said control conduit when pressure of fluid in said first conduit preponderates over that in said compensating chamber and the effect of said spring.

3. A brake cylinder device comprising an enclosed hollow casing having a main bore and a smaller bore coaxially aligned with and joining said main bore, a piston head slidably mounted in said main bore for travel from a release position through a normal operating range but movable into an extended position beyond said range upon the existence of a certain condition, said piston head defining between its one side and said casing a main pressure chamber, an annular member sealingly secured in positive connection to the opposite side of said piston head and slidable thereby in sealing engagement within said smaller bore for separating a load compensating chamber defined by its outer wall and said casing from a non-pressure chamber open to atmosphere, bias means for urging said piston head toward its said release position, one pipe through which fluid under pressure may flow into said main chamber for effecting movement of said piston head, another pipe through which fluid under pressure may flow into or from said compensating chamber, a first conduit exposed to pressure of fluid in said compensating chamber except when said piston head is in its said extended position and then exposed to pressure of fluid in said main chamber, shuttle valve means slidably mounted in said casing having an elongated annular groove formed in its outer periphery intermediate its ends for defining an annular chamber between said groove and said casing, said valve means being subject opposingly to pressure of fluid in said compensating chamber and in said first conduit and biased toward the adjacent end of said first conduit into one limit position but movable to an opposite limit position when pressure in said first conduit exceeds that in said compensating chamber, a second conduit always open to said annular chamber and exposed to said non-pressure chamber except when said piston head is in said extended position and then exposed to pressure of fluid in said compensating chamber, and a control conduit exposed to pressure of fluid in said annular chamber or in said first conduit according to whether said valve means is in its said one limit position or opposite limit position, respectively.

4. In a brake cylinder device, a control conduit, a piston assemblage slidably mounted in a casing subject opposingly to pressure of fluid in a main pressure chamber and in a load compensating chamber and having a normal operating range and an extended position beyond said range, the pressure of fluid in said compensating chamber acting over a smaller effective area of said piston assemblage than pressure in said main chamber acts, a first conduit charged with fluid under pressure from said main chamber when said assemblage is in its extended position, a second conduit charged with fluid under pressure from said compensating chamber when said assemblage is in its extended position, and valve means operative to open said control conduit to atmosphere when said assemblage is within its normal range and operative when said assemblage is in its extended position to effect pressurization of said control conduit by way of said first conduit or said second conduit according to whether pressure of fluid in said main chamber is greater than or equal to that in said compensating chamber, respectively.

5. A brake cylinder device comprising, in combination, a casing having two piston bores of different diameters coaxially aligned and open to each other at adjacent ends, a main piston and another piston disposed and slidable in said bores, respectively, means connecting said pistons together for movement in unison and cooperating with said pistons to define between them a compensating chamber, said casing and the outer side of said main piston cooperating to define a main pressure chamber to which fluid under pressure is adapted to be supplied for moving said pistons in a direction away from said main pressure chamber to apply brakes to a degree dependent upon the differential in pressures of fluid in said main chamber and compensating chamber, a first conduit connected to said bore of larger diameter, a second conduit connected to said bore of smaller diameter, said first and second conduits being so arranged as to be open to said compensating chamber and to atmosphere, respectively, except upon movement of said pistons by fluid under pressure in said main pressure chamber beyond a chosen position in their respective bores, whereupon said first conduit and second conduit will be uncovered by said pistons to the main pressure chamber and compensating chamber, respectively, a control conduit, a bias spring, a valve subject to pressure of said spring and pressure of fluid in said compensating chamber opposing pressure of fluid in said first conduit and operative upon equalization of such opposing fluid pressures to open said control conduit to said second conduit and operative upon a preponderance of pressure of fluid in said first conduit over pressure of fluid in said compensating chamber to open said control conduit to said first conduit.

6. A brake cylinder device comprising in combination, a first casing portion having a bore closed at one end and open at the opposite end of said portion, a brake cylinder piston slidably mounted in said bore and cooperative with the closed end thereof to define a main pressure chamber for receiving fluid under pressure to move said piston in a direction away from said main pressure chamber to apply brakes, a second casing portion mounted against said first casing portion over the open end of said bore and having a bore of smaller diameter than, open at one end to and coaxially aligned with the first named bore, a second piston slidably mounted in the bore of smaller diameter, a sleevelike element connecting the two pistons together for movement in unison and cooperating with the casing portions and said pistons to define a load compensating chamber encircling said element and adapted to be either opened to atmosphere or to receive fluid under pressure to oppose pressure of fluid in said main chamber acting on said brake cylinder piston, a first conduit, a second conduit, said brake cylinder piston and second piston opening said first and second conduits to said compensating chamber and the atmosphere, respectively, in all positions of said pistons short of a chosen position assumed by movement in response to supply of fluid under pressure to said main pressure chamber, and said brake cylinder piston and second piston opening said first and second conduits to said main pressure chamber and compensating chamber, respectively, upon movement past said chosen position, said second casing portion having a bore open at one end to said compensating chamber and at the opposite end to said first conduit, a shuttle valve slidably mounted in the last named bore subject at opposite ends to pressure of fluid in said compensating chamber and said first conduit, respectively, a control conduit, a spring acting on said shuttle valve and assisting pressure of fluid in said compensating chamber to move said shuttle valve to a position for opening communication between said second conduit and said control conduit, and said shuttle valve being movable by a preponderance of fluid pressure in said first conduit, over that in said compensating chamber to another position for closing said communication and opening said first conduit to said control conduit.

7. A brake cylinder device for controlling application of brakes on a vehicle according to the load carried thereby and controlling take-up of slack in the brake rigging, said device comprising a casing, a brake cylinder piston assemblage slidably mounted in said casing and having a normal operating range but movable beyond said range when such slack exceeds a chosen limit, said piston assemblage being subject at one side to pressure of fluid in a main pressure chamber in said casing for moving said piston assemblage in a direction for applying brakes and subject to the opposing pressure of fluid in a compensating chamber controlled according to the load condition of said vehicle, fluid pressure in said compensating chamber acting over a smaller effective area of said piston assemblage than fluid pressure in said main chamber acts, a first conduit in said casing exposed to pressure of fluid in said compensating chamber except when said piston assemblage moves beyond said range and thereby opens said first conduit to said main chamber, a second conduit in said casing exposed to atmospheric pressure except when said piston assemblage moves beyond said range and opens said second conduit to said compensating chamber, a control conduit by way of which take up of slack is controlled, and valve means controlled by opposing fluid pressures in said first conduit and compensating chamber and normally in one position for maintaining said control conduit open to said second conduit and movable from said one position to another position only when fluid pressure in said first conduit preponderates over that in said compensating chamber for thereby connecting said first conduit to said control conduit.

8. A brake cylinder device for controlling application and release of brakes on a vehicle, said device comprising a casing, a brake cylinder piston assemblage slidably mounted in said casing and having a normal operating range but movable beyond said range upon the occurrence of a certain condition, said piston assemblage being subject to pressure of fluid in a main pressure chamber and, in opposition thereto, to pressure of fluid in a load compensating chamber wherein pressure is controlled according to load condition of said vehicle, the pressure in said compensating chamber acting on a smaller effective area of said piston assemblage than that in said main chamber, a first conduit and a second conduit open to said compensating chamber and to atmosphere, respectively, except when said piston assemblage is moved beyond said range by pressure of fluid in said main chamber, and then opened to said main chamber and compensated chamber, respectively, a control conduit, and valve means controlled by opposing fluid pressures in said first conduit and compensating chamber and normally in one position for connecting said second conduit to said control conduit and movable to another position for connecting said first conduit to said control conduit only upon the occurrence of said certain condition concurrently with a condition of pressure in said compensating chamber corresponding to a loaded condition of said vehicle.

9. The combination with a brake cylinder device of the type comprising a piston assemblage slidably mounted in a casing for movement from a rest position through a normal operating range and for movement beyond said normal range only upon the occurrence of a certain condition, said piston assemblage being subject at one side to pressure of fluid in a main pressure chamber for movement in a direction away from said rest position and subject at the opposite side to pressure of fluid in a load compensating chamber acting on a smaller effective area than pressure in said main chamber, and spring means for urging said piston assemblage to said rest position, of a first conduit exposed to pressure of fluid in said compensating chamber except when said piston assemblage moves beyond said normal range and uncovers said first conduit to said main chamber, a second conduit exposed to atmospheric pressure except when said piston assemblage moves beyond said normal range and uncovers said second conduit to said compensating chamber, a control conduit by way of which operation of a fluid pressure actuated slack adjusting device is controlled, and valve means controlled by opposing fluid pressures in said first conduit and compensating chamber and operative to connect said control conduit to atmosphere by way of said second conduit when said piston assemblage is within said normal range and operative when said piston assemblage is beyond said range to permit said control conduit to be charged with fluid under pressure by way of said first conduit or said second conduit according to whether pressure of fluid in said main chamber is greater than or equal to that in said compensating chamber, respectively.

10. A brake cylinder device of the differential piston type comprising a casing having therein two connected, coaxially aligned bores of different diameters, a differential piston assemblage having two connected pistons movable together as a unit, one of said pistons operating in the larger of said bores and the other operating in the smaller of said bores, means biasing said piston assemblage in one direction to a position for effecting a brake release, said piston assemblage being movable in the opposite direction in response to pressure of fluid acting in a main pressure chamber at the outer face of said one piston or to pressure of fluid acting in both said main chamber and in a load compensating chamber between said pistons for effecting a brake application according to the differential force of the opposing fluid pressures acting on said piston assemblage, a control conduit to which fluid under pressure may be supplied for effecting a desired control operation, a first conduit normally open to the compensating chamber, a second conduit normally open to atmosphere, valve means having one position for opening said control conduit to said second conduit and another position for closing off said control conduit from said second conduit and opening said control conduit to said first conduit, fluid pressure responsive means controlled by opposing fluid pressures in said first conduit and compensating chamber and operative only upon preponderance of fluid pressure in said first conduit over that in the compensating chamber for effecting operation of said valve means to its said other position, said piston assemblage having a normal operating range of travel and operative only upon travel beyond said range in said opposite direction for successively closing said second conduit and first conduit from the atmosphere and the compensating chamber, respectively, and then supplying fluid under pressure from the compensating chamber to said second conduit and also supplying fluid under pressure from the main chamber to said first conduit.

11. A brake cylinder device of the differential piston type, comprising a casing having therein two connected, coaxially aligned bores of different diameters, a differential piston assemblage having two connected pistons movable together as a unit, one of said pistons operating in the larger of said bores and the other operating in the smaller of said bores, means for biasing said piston assemblage in one direction to a position for effecting a brake release, said piston assemblage being movable in the opposite direction in response to pressure of fluid acting solely in a main pressure chamber adjacent the outer face of said one piston or to pressure of fluid acting in both said main chamber and in an annular load compensating chamber between said pistons for effecting a brake application according to the differential force of the opposing fluid pressures acting on said piston assemblage, a control conduit through which fluid under pressure may be supplied for effecting a desired control operation, and means for normally venting said control conduit and operative upon travel of said piston assemblage in excess of a certain amount in said opposite direction for supplying fluid under pressure to said control conduit selectively via a first communication or a second communication according to whether fluid pressure in the compensating chamber is less than or is substantially equal to the opposing pressure in said main chamber.

12. A brake cylinder device of the differential piston type, comprising a casing having therein two connected, coaxially aligned bores of different diameters, a differential piston assemblage having two connected pistons movable together as a unit, one of said pistons operating in the larger of said bores and the other operating in the smaller of said bores, means for biasing said piston assemblage in one direction to a position for effecting a brake release, said piston assemblage being movable in the opposite direction in response to pressure of fluid acting solely in a main pressure chamber at the outer face of said one piston or to pressure of fluid acting in both said main chamber and in an annular load compensating chamber between said pistons for effecting a brake application according to the differential force of the opposing fluid pressures acting on said piston assemblage, a control conduit through which fluid under pressure may be supplied for effecting a desired control operation, and valve means connected to said control conduit and operative during travel of said piston assemblage through a normal operating range to said control conduit to atmosphere and operative in response to travel of said piston assemblage beyond said range to assume one position or another position to cause fluid under pressure to be supplied to said control conduit by way of the main chamber or the compensating chamber according to whether fluid pressure in the compensating chamber is less than or is substantially equal to the pressure in said main chamber.

13. The combination of a brake cylinder of the differential piston type having two working spaces of unequal effective areas and adapted to develop different braking forces according as both or only the larger one of the working spaces is charged; pilot valve means having separate connections to each of said two working spaces and to atmosphere, and having two settings, and effective according to its setting during a brake application, to cause both working spaces to be charged or the larger one to be charged and the other not charged; a pneumatic slack adjuster; means affording distinct side-port flow-connections from respective working spaces to said slack adjuster; valve means shiftable reversely to render said side-port flow-connections selectively effective and motor means serving to shift the last named valve means reversely according as both or only the larger one of said working spaces is charged.

14. A brake cylinder device for controlling application of brakes on a vehicle according to the load carried thereby and controlling takeup of slack in the brake rigging, said device comprising a casing, differential piston means slidably mounted in said casing and having a normal operating range but movable beyond said range when such slack exceeds a chosen limit, said differential piston means being subject to pressure of fluid in a main pressure chamber opposing pressure of fluid in a compensating chamber, which latter pressure acts over a smaller effective area of said differential piston means than pressure in said main chamber acts thereon, said main chamber always being charged with fluid under pressure during a brake application, and said compensating chamber during a brake application being charged with fluid at the pressure of fluid in the main chamber or vented according to whether the vehicle is empty or loaded for thereby providing different braking forces according to vehicle load, a control conduit chargeable with fluid under pressure and ventable to atmosphere for controlling takeup of such slack, and valve means positioned during travel of said differential piston means within said range to vent said control conduit and positioned responsively to travel of said differential piston means beyond said range to supply fluid under pressure to said control conduit from said main chamber or from said compensating chamber according to whether fluid pressure in said main chamber exceeds or is equal to that in said compensating chamber.

15. A brake cylinder for controlling application of brakes on a vehicle according to the load carried thereby and controlling takeup of slack in the brake rigging, said device comprising a casing, differential piston means slidably mounted in said casing and having a normal operating range but movable beyond said range when such slack exceeds a chosen limit, said differential piston means being subject to pressure of fluid in a main pressure chamber opposing pressure of fluid in a compensating chamber, which latter pressure acts over a smaller effective area of said differential piston means than pressure in said main chamber acts thereon, said main chamber always being charged with fluid under pressure during a brake application, and said compensating chamber during a brake application being charged with fluid at the pressure of fluid in the main chamber or vented according to whether the vehicle is empty or loaded for thereby providing different braking forces according to vehicle load, a first conduit to which fluid under pressure is supplied from said main chamber responsively to movement of said differential piston means beyond said range, a second conduit to which fluid under pressure is supplied from said compensating chamber responsively to movement of said differential piston means beyond said range, a normally vented control conduit to which fluid under pressure may be supplied for initiating a slack takeup operation, valve means normally positioned to connect said second conduit to said control conduit, and motor means serving only while said differential piston means is beyond said range concurrently with a fluid pressure in said compensating chamber less than that in said main chamber to shift said valve means from its normal position to another position in which said first conduit is connected to the control conduit.

References Cited in the file of this patent

UNITED STATES PATENTS

| | | |
|---|---|---|
| 1,786,299 | Hancock | Dec. 23, 1930 |
| 2,065,215 | Former et al. | Dec. 22, 1936 |
| 2,482,246 | Cook et al. | Sept. 20, 1949 |